US012801057B2

(12) United States Patent
Nagayama et al.

(10) Patent No.: US 12,801,057 B2
(45) Date of Patent: Nov. 17, 2026

(54) CARRIER, DEVELOPING AGENT, IMAGE FORMING METHOD, IMAGE FORMING APPARATUS, AND PROCESS CARTRIDGE

(71) Applicants: Masashi Nagayama, Shizuoka (JP); Kento Takeuchi, Shizuoka (JP); Tomomi Suzuki, Shizuoka (JP); Tohru Suganuma, Shizuoka (JP)

(72) Inventors: Masashi Nagayama, Shizuoka (JP); Kento Takeuchi, Shizuoka (JP); Tomomi Suzuki, Shizuoka (JP); Tohru Suganuma, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 282 days.

(21) Appl. No.: 18/592,573

(22) Filed: Mar. 1, 2024

(65) Prior Publication Data

US 2024/0295834 A1 Sep. 5, 2024

(30) Foreign Application Priority Data

Mar. 3, 2023 (JP) ................................ 2023-033078

(51) Int. Cl.
*G03G 9/113* (2006.01)
*G03G 9/08* (2006.01)
*G03G 21/18* (2006.01)

(52) U.S. Cl.
CPC ......... *G03G 9/1139* (2013.01); *G03G 9/0823* (2013.01); *G03G 21/1814* (2013.01)

(58) Field of Classification Search
CPC . G03G 9/1139; G03G 9/0823; G03G 21/1814
See application file for complete search history.

(56) References Cited

U.S. PATENT DOCUMENTS

2011/0086307 A1 4/2011 Nakajima et al.
2011/0091802 A1 4/2011 Takahashi et al.
2011/0171573 A1 7/2011 Sakata et al.
2014/0356783 A1* 12/2014 Yoshifuku ............ G03G 9/1136 430/111.35
2015/0132690 A1* 5/2015 Asahina ............ G03G 9/08797 430/105
2018/0329331 A1* 11/2018 Kurano ................ G03G 9/1133
2020/0166867 A1 5/2020 Nagayama et al.
2020/0319571 A1 10/2020 Takeuchi et al.
2022/0187729 A1 6/2022 Nagayama et al.
2022/0283523 A1 9/2022 Nagayama et al.

(Continued)

FOREIGN PATENT DOCUMENTS

JP H11202560 A * 7/1999
JP 2006-079022 A 3/2006

(Continued)

OTHER PUBLICATIONS

English machine translation of the description of JP-H11202560-A (Year: 1999).*

(Continued)

*Primary Examiner* — Boone Alexander Evans
(74) *Attorney, Agent, or Firm* — XSENSUS LLP

(57) ABSTRACT

A carrier contains a core material with a surface roughness Rz of from 2.0 to 3.0 μm; and a coating layer to cover the core material, the coating layer comprising an antimony-containing particle.

19 Claims, 2 Drawing Sheets

(56) References Cited

U.S. PATENT DOCUMENTS

| | | | |
|---|---|---|---|
| 2022/0291603 | A1 | 9/2022 | Kishida et al. |
| 2022/0291604 | A1 | 9/2022 | Suzuki et al. |
| 2023/0195004 | A1 | 6/2023 | Masuda et al. |
| 2023/0205108 | A1 | 6/2023 | Masuko et al. |
| 2023/0305439 | A1 | 9/2023 | Nagayama et al. |
| 2023/0393491 | A1 | 12/2023 | Takeuchi et al. |

FOREIGN PATENT DOCUMENTS

| | | | | |
|---|---|---|---|---|
| JP | 2007248614 | A | * | 9/2007 |
| JP | 2011-145397 | A | | 7/2011 |
| JP | 2011-209678 | A | | 10/2011 |
| JP | 2014-149334 | A | | 8/2014 |
| JP | 2018-141864 | A | | 9/2018 |
| JP | 2020-129029 | A | | 8/2020 |

OTHER PUBLICATIONS

English machine translation of the description of JP-2007248614-A (Year: 2007).*

U.S. Appl. No. 18/506,417, filed Nov. 10, 2023.

* cited by examiner

CARRIER, DEVELOPING AGENT, IMAGE FORMING METHOD, IMAGE FORMING APPARATUS, AND PROCESS CARTRIDGE

CROSS-REFERENCE TO RELATED APPLICATION

This patent application is based on and claims priority pursuant to 35 U.S.C. § 119 to Japanese Patent Application No. 2023-033078, filed on Mar. 3, 2023, in the Japan Patent Office, the entire disclosure of which is hereby incorporated by reference herein.

BACKGROUND

Technical Field

The present disclosure is related to a carrier for forming an electrophotographic image, a developing agent for forming an electrophotographic image, an image forming method, an image forming apparatus, and a process cartridge.

Description of the Related Art

For image forming methods such as electrophotography and electrostatic photography, two known methods exist: One is to use a two-component developing agent obtained by mixing toner and carrier; and the other is to use a one-component developing agent that does not contain a carrier.

In the two-component developing method, the carrier undergoes coating with a suitable material to enhance durability. This coating aims to prevent toner spent on the carrier surface, form uniform carrier surface, prevent surface oxidation, mitigate decreases in moisture sensitivity, extend the developing agent's working lifespan, protect the photoconductor from scratches or wear caused by the carrier, enable control of polarity, and adjust the charging size.

SUMMARY

According to embodiments of the present disclosure, a carrier is provided that contains a core material with a surface roughness Rz of from 2.0 to 3.0 μm and a coating layer to cover the core material, the coating layer containing an antimony-containing particle.

As another aspect of embodiments of the present disclosure, a developing agent is provided that contains a carrier containing a core material with a surface roughness Rz of from 2.0 to 3.0 μm and a coating layer to cover the core material, the coating layer containing an antimony-containing particle.

As another aspect of embodiments of the present disclosure, an image forming method is provided that includes forming a latent electrostatic image on a latent electrostatic image bearer, developing the latent electrostatic image formed on the latent electrostatic image bearer with the developing agent mentioned above to form a toner image, transferring the toner image formed on the latent electrostatic image bearer to a recording medium, and fixing the toner image transferred to the recording medium.

As another aspect of embodiments of the present disclosure, an image forming apparatus is provided that includes a latent electrostatic image bearer, a charger for charging the latent electrostatic image bearer, an irradiator for irradiating the latent electrostatic image bearer with light to form a latent electrostatic image, a developing device for developing the latent electrostatic image formed on the latent electrostatic image bearer with the developing agent mentioned above to form a toner image, a transfer device to transfer the toner image formed on the latent electrostatic image bearer onto a recording medium; and a fixing device to fix the toner image transferred to the recording medium.

As another aspect of embodiments of the present disclosure, a process cartridge is provided that includes a latent electrostatic image bearer, a charger for charging the latent electrostatic image bearer, a developing device for developing a latent electrostatic image formed on the latent electrostatic image bearer with the developing agent mentioned above, and a cleaning device to clean the latent electrostatic image bearer.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
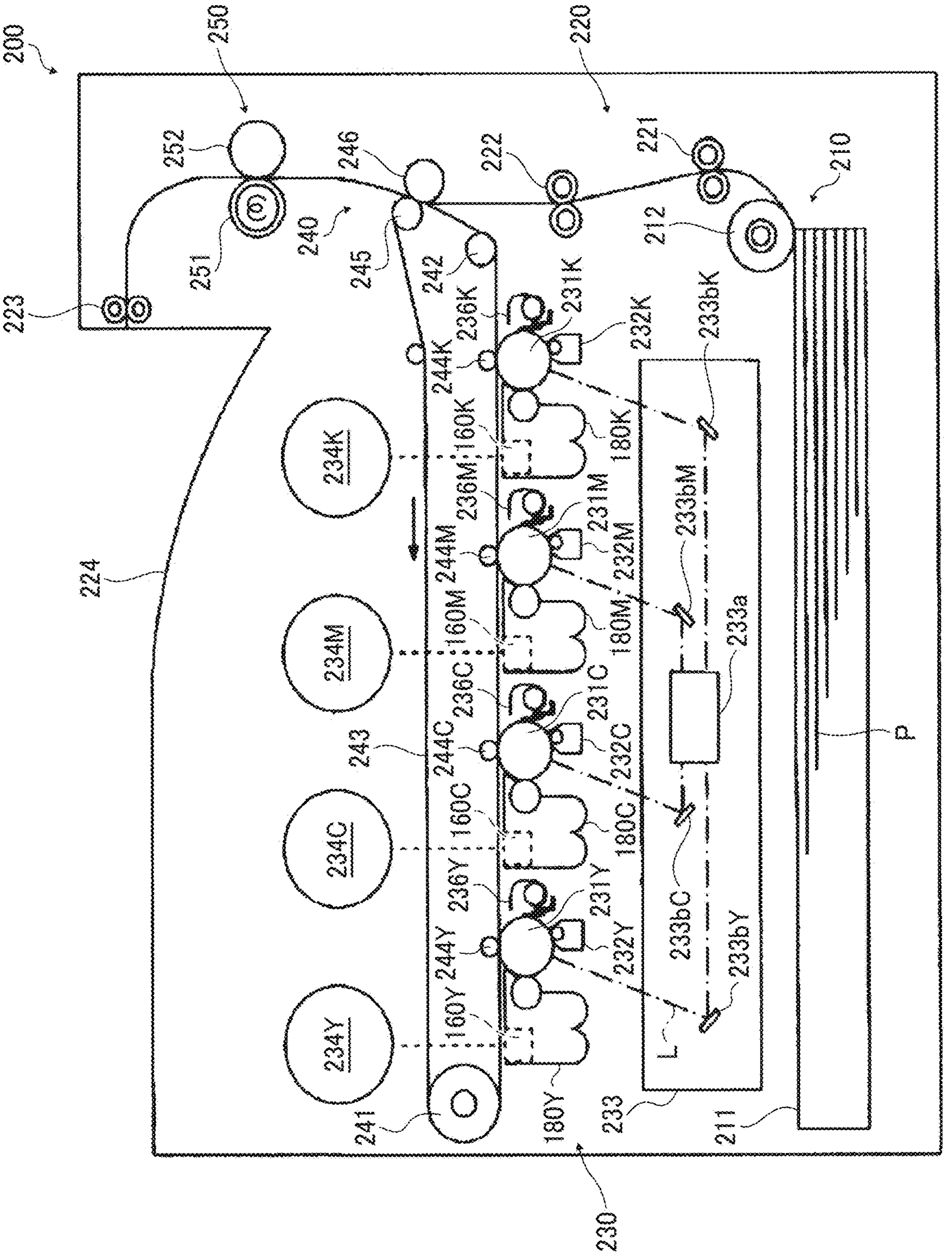
FIG. 1 is a schematic diagram illustrating an image forming apparatus according to an embodiment of the present invention.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A two-component developing agent containing the carrier of the present invention can maintain stable electrical resistance and stabilize chargeability over long-term use, thereby reducing fluctuations in image density for prolonged usage periods.

A carrier containing antimony-doped tin oxide in its carrier coating layer has been proposed in Japanese Unexamined Patent Application Publication No. 2007-248614. Antimony-doped tin oxide exhibits high conductivity and is an excellent resistance adjusting agent with high resistance adjustment capability. Furthermore, due to its high resistance adjustment capability, it is possible to relatively reduce the required dosage to achieve a specific electrical resistance in the carrier. Consequently, it is less likely to impair the magnetic moment acting on each carrier particle due to magnetization of the core material particles, which helps to maintain the magnetic binding force to the developing agent bearer. This force reduces the occurrence of a problem known as “carrier adhesion,” where the developing agent adheres to the developing agent bearer, leading to an improved image quality and longer lifespan of the image bearer.

Carriers containing barium sulfate in their coating films, with a Ba/Si ratio for all the elements measured by XPS ranging from 0.01 to 0.08 have been proposed in Japanese Unexamined Patent Application Publication Nos. 2011-145397 (Japanese Patent No. 5534409) and 2011-209678. Examples utilizing barium sulfate as a substrate have been proposed in Japanese Unexamined Patent Application Publication No. 2006-079022.

The carrier disclosed in Japanese Unexamined Japanese Patent Application No. 2007-248614 mentioned above, due to its high resistance adjustment capability, tends to cause significant resistance variation when detached from the carrier, leading to excessive charging capacity and, consequently, a decrease in image density over prolonged use. Additionally, its high resistance adjustment capability results in a relatively carrier’s low content in the coating layer, leading to a reduced ratio of the inorganic material in the coating layer, which reduces the strength of the coating layer. Consequently, friction or collision between carriers or between carriers and toner can easily cause abrasion of the coating layer, accelerating the disappearance of antimony-doped tin oxide along with the wear of the coating layer. This further exacerbates factors such as resistance variation, increased charging capacity, and decreased image density mentioned earlier.

Japanese Unexamined Patent Application Publication Nos. 2011-145397 (Japanese Patent No. 5534409), 2011-209678, and 2006-079022 mentioned above highlight the effectiveness to the decrease in charging capacity of the carrier when replenishing toner over a high resolution image region.

However, these effects rely on utilizing the charging imparting ability of the second conductive particles alone, thus while effective in reducing the decrease in charging capacity, they cannot be expected to hinder the increase in charging due to the rise in electrical resistance.

The inventors of the present invention have made an investigation to address the above-mentioned issues. The present invention was made with the aim of providing a carrier for electrophotographic image formation capable of maintaining stable electrical resistance and stabilizing chargeability even for a long-term use, thereby reducing fluctuations in image density over prolonged usage periods.

The above-mentioned issues can be solved by embodiments of the present invention with the following configuration.

It is a carrier that contains a core material with a surface roughness Rz of from 2.0 to 3.0 μm and a coating layer that covers the core material, the coating layer containing an antimony-containing particle.

Embodiments of the present invention is described in detail below.

The inventors of the present invention have made an investigation to address the above-mentioned issues. Through these efforts, the inventors have found that a carrier for forming electrophotographic images containing core particles and a coating layer covering the core particles, wherein the coating layer contains particles containing at least antimony, and the surface roughness Rz of the core particles is from 2.0 to 3.0 μm, can maintain stable electrical resistance and stabilize chargeability over long-term use, thereby, reducing fluctuations in image density during prolonged usage periods.

As described above, when the resistance adjustment agent, the particles containing at least antimony, in the carrier coating layer, is detached due to friction or collision between carriers or between carriers and toner during prolonged use as a developing agent, the electrical resistance of the carrier tends to increase. Consequently, resulting excessive charging capacity leads to a decrease in image quality, such as a reduction in image density. The inventors have found thorough investigations into this issue that the amount of detachment of the carrier coating layer component containing the resistance adjustment agent varies depending on the surface roughness of the core particles, in particular, the surface roughness Rz.

Increasing the surface roughness Rz of core material particles to 2.0 or more m can reduce the increase in electrical resistance of carriers during long-term use. Rz is an indicator of surface roughness in the depth direction of concave parts, and by increasing Rz, the components of the carrier coating layer containing the resistance adjusting agent can penetrate into the deep concave portions of the surface of the core material particles. The carrier coating layer components that have penetrated into the concave parts are less likely to detach from the carrier even when subjected to friction or collision between carriers or with toner particles. Therefore, even during long-term use, it is less likely to lose the resistance adjusting agent, and the electrical resistance of the carrier is less likely to increase.

This charge rise reduction effect is particularly significant in carriers using antimony-based resistance adjusting agents, as their resistance variation range is large relative to the detachment amount due to high efficiency of resistance adjustment, and the strength of the coating layer tends to be low due to the relatively low content in the coating layer.

In particular, this effect becomes prominent when Rz is 2.0 or more μm. At an Rz less than 2.0 μm, the volume for penetration of carrier coating layer components is small, making it difficult to achieve a significant effect. Moreover, at an Rz exceeding 3.0 μm, carrier particles are prone to damage during long-term use due to insufficient core material strength, leading to a decrease in mass per core material particle, which reduces the carriers’ magnetic moment. As a result, carrier adhesion and abnormal images such as spotted images tend to occur and shorten the working lifespan of an image bearer.

The term Rz of a core material particle refers to the maximum height of a surface texture (roughness curve) defined in JIS B 0601: 2001 or ISO 13565-1 (Geometrical Product Specifications (GPS) Surface texture: Profile method; Surfaces having stratified functional properties).

Antimony can be incorporated in particles or used as particles themselves. Antimony-doped tin oxide, in particular, can exhibit exceptionally high resistance adjusting capability.

As mentioned above, antimony is an excellent resistance-adjusting material with high capability; however, diantimony trioxide, a commonly used compound for resistance adjustment, is not a preferable material because it raises a concern about being harmful to the human body. On the other hand, diantimony pentoxide can maintain efficient resistance-adjusting capability while reducing the harmful effects on the human body, making it preferable.

Preferably, antimony-containing particles utilize inorganic particles as a substrate. Using a substrate of inorganic particles can prevent particles containing antimony from collapsing into fragments within a coating layer and detaching from it, thus maintaining their resistance-adjusting capability.

The inorganic particle as a substrate can be made of either traditional or newly developed materials. Aluminum oxide is particularly favored for enhancing resistance-adjusting capability. This preference is due to aluminum oxide's strong affinity for electroconductive treatment on the surface of the substrate particle, which is considered to effectively facilitate the treatment process.

The carrier of the present disclosure preferably has an apparent density ranging from 2.0 to 2.5 (g/cm$^3$).

The apparent density of the carrier closely correlates with the mass per carrier particle, and carriers with lower bulk density also possesses lower mass per particle. A low mass per carrier particle results in a low magnetic moment per carrier particle, increasing the likelihood of carrier adhesion. This adhesion becomes particularly conspicuous when the apparent density of the carrier falls below 2.0 g/cm$^3$. A higher apparent density reduces the spatial occupancy rate of carriers in the development region as the developing agent conveys a predetermined amount of toner. A carrier's low spatial occupancy rate leads to an increase in the bulk electrical resistance of the developing agent in the development region. This increase invites malfunctions in the movement of charges between the developing agent bearer and the image bearer, contributing to the occurrence of abnormal images known as ghost images. The occurrence of ghost images becomes high especially when the carrier's apparent density exceeds 2.5 (g/cm$^3$). The carrier's apparent density is measured according to JIS-Z2504:2000.

The carrier for electrophotographic image formation according to the present disclosure may contain inorganic particles in addition to the antimony-containing particles mentioned above. As inorganic particles to be included in addition to the antimony-containing particles, substances such as barium sulfate, magnesium oxide, magnesium hydroxide, hydrotalcite, aluminum oxide, titanium oxide, and zinc oxide, can be listed, but are not limited to thereto.

A carrier containing chargeable particles other than the antimony-containing particles mentioned above can reduce the decrease in the carrier's charging capacity by its charging power when toner is provided over an image region with a high definition. As a result, the occurrence of abnormalities such as toner scattering and background fouling attributable to the decrease in charging size are less likely to occur.

The term "chargeable particle" refers to particles with relatively low ionization potential, more specifically, referring to particles with lower ionization potential than aluminum oxide particles (AA-03, available from Sumitomo Chemical Company). Specific examples include, but are not limited to, barium sulfate, zinc oxide, magnesium oxide, magnesium hydroxide, and hydrotalcite, with barium sulfate being particularly preferable. Ionization potential measurement can be performed using PYS-202, available from Sumitomo Heavy Industries, Ltd.

If the chargeable particle is barium sulfate, using simple barium sulfate is preferable. Barium sulfate exerts its charge-imparting effect on contact with toner when it is present on the surface of the carrier coating layer.

However, in the case other than simple barium sulfate, the likelihood of its contact with toner decreases, resulting in a failure to maximize the charge control effect.

The core material particles used in the carrier of the present disclosure can be suitably selected from those known for use in a two-component developing agent containing a carrier for electrophotography.

Examples include, but are not limited to. ferromagnetic metals such as iron and cobalt, iron oxides such as magnetite, hematite, and ferrite, various alloys and compounds, and resin particles in which these magnetic materials are dispersed. Of these, in terms of the environmental concerns, Mn-based ferrite, Mn—Mg-based ferrite, and Mn—Mg—Sr ferrite are preferable.

There is no specific limitation to the volume average particle diameter of the core material of the carrier for use in the present disclosure. In terms of prevention of carrier adhesion and carrier scattering, the volume average particle diameter is preferably or more μm. The volume average particle diameter is preferably no greater than m to prevent the production of images with abnormalities including carrier streaks resulting in degradation of the image quality. A core material with a volume average particle diameter of 20 to 60 μm particularly matches the demand for higher image quality of late. The volume average particle diameter can be measured by using MT3000 II series, available from Microtrac.

One way of forming the carrier of the present disclosure is to dissolve the resin described above in a solvent to prepare a liquid application and apply the liquid application to the surface of the core material particle by a known application method, followed by drying and baking.

Specific examples of the known application methods include, but are not limited to, a dip coating method, a spray coating method, and a brushing method.

There is no specific limitation to the solvent and it can be suitably selected to suit to a particular application.

Specific examples include, but are not limited to, toluene, xylene, methylethylketone, methylisobutyll ketone, cellosolve, butylacetate, and synthetic isoparaffin-based hydrocarbon.

The method of baking is not particularly limited and can be suitably selected to suit to a particular application. It can be external or internal heating.

The device for baking is not particularly limited and can be suitably selected to suit to a particular application. It includes, but is not limited to, a fixed electric furnace, fluid type electric furnace, rotary electric furnace, burner furnace, and a device with a microwave.

The average thickness of the coating layer is preferably from 0.1 to 1.0 μm and more preferably from 0.1 to 0.9 μm.

The average thickness of the coating layer can be measured using equipment like a transmission-electron microscope (TEM), for example.

As for the coating resin for the career, silicone resin, acrylic resin, or a combination of these can be used. Acrylic resin exhibits excellent wear resistance because it has strong adhesion and low brittleness. However, it has a high surface energy, which can lead to issues such as decreased charging due to the accumulation of toner components spent when combined with toner prone to be spent. In that case, incorporating silicone resin, which has a low surface energy and hinders accumulation of toner components spent leading to film peeling, can resolve this problem. However, silicone resin also has drawbacks of weak adhesion and high brittleness, resulting in poor wear resistance. Thus, achieving a balance between the properties of these two resins is needed. With such balance, the resulting coating layer is less likely to experience toner spent and can possess wear resistance. This is because silicone resin has a low surface energy and does not easily cause toner components spent, preventing its accumulation resulting in film scraping.

The silicone resin in the present disclosure represents all of the known silicone resins. Examples include, but are not limited to, straight silicone resins formed of organosiloxane bonding alone and silicone resins modified with bonding such as alkyd, polyester, epoxy, acrylic, and urethane.

Specific examples of the procurable straight silicone resins include, but are not limited to, KR271, KR255, and KR152, available from Shin-Etsu Chemical Co., Ltd. and SR2400, SR2406, and SR2410, available from DOW CORNING TORAY CO., LTD. In this case, it is possible to use simple silicone resin, but it is also possible to use other components for cross-linking reactions or charge control simultaneously.

Specific examples of the procurable modified silicone resins include, but are not limited to, KR206 (alkyd-modified), KR5208 (acrylic-modified), ES1001N (epoxy-modified), and KR305 (urethane-modified), all available from Shin-Etsu Chemical Co., Ltd. and SR2115 (epoxy-modified) and SR2110 (alkyd-modified), both available from DOW CORNING TORAY CO., LTD.

As the polycondensation catalysts, titanium-based catalysts, tin-based catalysts, zirconium-based catalysts, and aluminum-based catalysts are suitable. In the present disclosure, of these various catalysts, titanium diisopropoxybis (ethylacetateacetate) is most preferable of the titanium-based catalysts bringing excellent results. This is because titanium diisopropoxybis is inferred to accelerate the condensation reaction of a silanol group and inhibit the catalyst from easily deactivating.

The acrylic resin in the present disclosure represents all the resins including acrylic components and has no particular limitation. In addition, it is possible to use simple acrylic resins but optional to use one or more other components simultaneously that conduct cross-linking reaction.

Examples of the other components for conducting cross-linking reaction are amino resins and acidic catalysts. The other components are not limited thereto. The amino resin represents guanamie resins and melamine resins, for example. However, the amino resins are not limited thereto. In addition, as the acidic catalyst, any substance demonstrating catalystic function can be used. It includes, but is not limited to, a substance having a reaction group such as a complete alkylized type, methylol group type, imino group type, methylol/imino group type.

In addition, the coating layer more preferably includes cross-linked matter of an acrylic resin and an amino resin. Such matter can prevent fusion of coating layers while keeping suitable resilience.

The amino resin has no particular limit. Specifically, melamine resins and benzoguanamine resins are preferable in order to improve the charging power of carrier. In addition, to suitably control the charging power of carrier, melamine resin and/or benzoguanamine resin can be used in combination with other amino resins.

As the acrylic resin cross-linkable with an amino resin, acrylic resins having hydroxyl group and/or carboxyl group are preferable and acrylic resins having a hydroxyl group are more preferable. Inclusion of such resins improves attachment of core particles and electroconductive particles more and enhance the dispersion stability of the electrocondcutive particles. The acrylic resin preferably has a hydroxyl value of 10 or greater mgKOH/g and more preferably 20 or greater mgKOH/g.

In the present disclosure, the composition for coating layer preferably includes a silane coupling agent. Such inclusion makes it possible to stably disperse the electroconductive particle.

There is no specific limitation to the silane coupling agent. Specific examples include, but are not limited to, γ-(2-aminoethyl)aminopropyl trimethoxyslane, γ-(2-aminoethyl) aminopropyl methyldimethoxydlane, γ-methacryloxy propyltrimethoxysialne, N-β-(N-vinylbenzyl aminoethyl)-γ-aminopropyl trimethoxysialne hydrochloride, γ-glycidoxypropyl trimethoxysilane, γ-meracaptopropyl trimethoxyslane, methyltrimethoxysilane, methyltriethoxysilane, vinyltriacetoxysialne, γ-chloropropyl trimethoxyxilane, hexamethyldislazane, γ-anilinopropyl trimethoxyxilane, vinyltrimethoxyxilane, octadecyldimethyl[3-(trimethoxysilyl)propyl]ammonium chloride, γ-chloropropylmethyl dimethoxy silane, methyltrichlorosilane, dimethyl dichlorosilane, trimethylchlorosilane, aryltriethoxysialne, 3-aminopropylmethyl diethoxysialne, 3-aminopropyltrimethoxysilane, dimethyl diethoxysilane, 1,3-divinyltetramethyl dislazane, and methacryloxy ethyl dimethyl(3-trimethoxysilylpropyl)ammonium chloride. These can be used alone or in combination.

Specific examples of the procurable silane coupling agent include, but are not limited to, AY43-059, SR6020, SZ-6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (all manufactured by Dow Corning Toray Co., Ltd.).

The proportion of the silane coupling agent to a silicone resin is preferably from 0.1 to percent by mass. When the content of the silane coupling agent is less than 0.1 percent by mass, the attachment of core material particles and electroconductive particles with a silicone resin deteriorates so that the coating layer may be detached over an extended period of use. When the content of the silane coupling agent is greater than 10 percent by mass, filming of toner tends to occur during an extended period of use.

The developing agent of the present disclosure contains the carrier of the present disclosure and toner.

The toner contains a binder resin and may be one of monochrome toner, color toner, white toner, and transparent toner. The carrier of the present disclosure is to prevent contamination of toner caused by carbon black, for example. Its effect is significant especially when the carrier is used as a developing agent in combination with color toner, in particular, yellow toner, white toner, or transparent toner.

The toner may contain a release agent when it is applied to an oil free system, in which oil preventive for toner fixation is not applied to a fixing roller. Such toner tends to cause filming in general. However, since the carrier of the present disclosure can reduce filming, the developing agent of the present disclosure can maintain good quality for an extended period of time.

Toner can be manufactured by a known method such as pulverization and polymerization. For example, when toner is manufactured by pulverization, the mixture obtained by mixing and kneading toner materials is cooled down, pulverized, and classified to manufacture mother particles. Next, to enhance transferability and durability, external additives are added to the mother particle to manufacture toner.

The device for mixing and kneading toner materials is not particularly limited. For example, batch-type twin rolls, Bumbury's mixer, continuation-type twin shaft extruder such as a KTK type twin-shaft extruder (available from KOBE STEEL, LTD.), a TEM type twin-shaft extruder (available from TOSHIBA MACHINE CO., LTD.), a twin-shaft extruder (available from ASADA IRON WORKS CO., LTD.), a PCM type twin-shaft extruder (available from IKEGAI LTD.), and a KEX type twin-shaft extruder (available from KURIMOTO LTD.); and a continuation-type single-shaft kneader such as a Co-Kneader available from COPERION BUSS AG can be preferably used as the device for mixing and kneading the toner material.

In addition, when the cooled-down melt-kneaded mixture is pulverized, it is coarsely-pulverized with a device such as a hammer mill and ROTOPLEX, and thereafter finely-pulverized with a fine pulverizer utilizing a jet air or a mechanical force. It is preferable to pulverize the mixture until the average particle diameter becomes 3 to 15 μm.

Moreover, an air classifier can be used to further classify the pulverized melt-kneaded mixture. It is preferable to classify the mixture to achieve an average particle diameter of the mother particle of from 5 to 20 μm.

In addition, when an external additive is added to the mother particle, these are mixed and stirred with a mixer so that the external additive is caused to adhere to the surface of the mother particle as the external additive is pulverized.

The binder resin is not particularly limited.

Specific examples include, but are not limited to, styrene polymers and substituted styrene polymers such as polystyrene, poly-p-styrene, and polyvinyltoluene; styrene copolymers such as styrene-p-chlorostyrene copolymers, styrene-propylene copolymers, styrene-vinyltoluene copolymers, styrene-methyl acrylate copolymers, styrene-ethyl acrylate copolymers, styrene-methacrylate copolymers, styrene-methyl methacrylate copolymers, styrene-ethyl methacrylate copolymers, styrene-butyl methacrylate copolymers, styrene-α-methyl chloromethacrylate copolymers, styrene-acrylonitrile copolymers, styrene-vinyl methyl ether copolymers, styrene-vinyl methyl ketone copolymers, styrene-butadiene copolymers, styrene-isopropylene copolymers, and styrene-maleic acid ester copolymers; and other resins such as polymethyl methacrylate, polybutyl methacrylate, polyvinyl chloride, polyvinyl acetate, polyethylene, polyesters, epoxy resins, polyurethane resins, polyvinyl butyral resins, polyacrylic resins, rosin, modified rosins, terpene resins, phenol resins, aliphatic or aromatic hydrocarbon resins, and aromatic petroleum resins. These resins can be used alone or in combination.

The binder resin for pressure fixing is not particularly limited.

Specific examples include, but are not limited to, polyolefins such as low molecular weight polyethylenes and low molecular weight polypropylenes; olefin copolymers such as ethylene acrylic acid copolymers, styrene-methacrylic acid copolymers, ethylene methacryrate copolymers, ethylene-vinyl chloride copolymers, ethylene-vinyl acetate copolymers, and ionomer resins; epoxy resins, polyester resins, styrene-butadiene copolymers, polyvinyl pyrrolidone, methylvinyl ether-maleic anhydride, maleic acid modified phenol resins, and phenol modified terpene resins. These can be used alone or in combination.

The colorant (pigment or dye) is not particularly limited. Specific examples include, but are not limited to, yellow pigments such as cadmium yellow, mineral fast Yellow, nickel titanium yellow, naples yellow, Naphthol Yellow S, Hanza Yellow G, Hanza Yellow 10G, Benzidine Yellow GR, quinoline yellow lake, Permanent Yellow NCG, and tartrazine lake, orange pigments such as molybdenum orange, Permanent Orange GTR, pyrazolone orange, Vulcan Orange, and Indanthrene Brilliant orange GK, red pigments such as red iron oxide, cadmium red, Permanent Red 4R, lithol red, pyrazolone red, watching red calcium salt, Lake Red D, Brilliant Carmine 6B, Eosine Lake, Rhodamine Lake B, Alizarine Lake, and Brilliant Carmine 3B, violet pigments such as Fast Violet B and Methyl Violet Lake, blue pigments such as cobalt blue, Alkali Blue, Victoria Blue Lake, Phthalocyanine Blue, metal-free Phthalocyanine Blue, Phthalocyanine Blue portion chlorinated article, Fast Sky Blue, and Indanthrene Blue BC, green pigments such as Chrome Green, chromium oxide, Pigment Green B, and Malachite Green Lake, black pigments such as adine-based pigments such as carbon black, oil furnace black, channel black, lamp black, acetylene black, and aniline black, meal salt azo pigments, metal oxides, and complex metal oxides, and white pigments such as titanium oxide. These can be used alone or in combination. Also, these are not used in the case of transparent toner.

The release agent is not particularly limited.

Specific examples include, but are not limited to, polyolefins such as polyethylene and polypropylene, metal salts of aliphatic acid, esters of aliphatic acid, paraffin wax, amide-based waxes, polyalcohol waxes, silicone waxes, carnauba wax, ester waxes. These can be used alone or in combination.

The toner may furthermore contain a charge control agent. The charge control agent is not particularly limited.

Specific examples include, but are not limited to, nigrosine; azine dyes with alkyl groups having 2 to 16 carbon atoms; and basic dyes such as C.I. Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Violet 10 (C.I. 42555), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44045), C.I. Basic Green 1 (C.I. 42040), and C.I. Basic Green 4 (C.I. 42000); lake pigments of these basic dyes; quaternary ammonium salts such as C.I. Solvent Black 8 (C.I. 26150), benzoylmethylhexadecylammonium chloride, and decyltrimethylchloride; dialkyltin compounds such as dibutyl and dioctyl; dialkyltin borate compounds; guanidine derivatives; polyamine resins such as vinyl polymers with amino groups and condensation polymers with amino groups; metal complex of monoazo dye; salicylic acid; metal complexes of dialkylsalicylic acid, naphthoic acid, and dicarboxylic acid with Zn, Al, Co, Cr or Fe; sulfonated copper phthalocyanine pigments; organic boron salts; fluorine-containing quaternary ammonium salts; and calixarene compounds. These can be used alone or in combination. Metal salts of white salicylic derivatives are preferable for color toner excluding black toner.

The external additive is not particularly limited. Examples are inorganic particles of silica, titanium oxide, alumina, silicone carbide, silicon nitride, boron nitride, etc. and resin particles such as polymethacrylic acid methyl particles and polystyrene particles with an average particle diameter of 0.05 to 1 μm obtained by a soap-free emulsification polymerization method. These can be used alone or in combination. Of these, metal oxide particles such as silica or titanium oxide whose surface is hydrophobized are preferable. Furthermore, a toner obtained by using hydrophobized silica and hydrophobized titanium oxide where the amount of the hydrophobized titanium oxide is greater than that of the hydrophobized silica has stable chargeability to humidity.

The image forming apparatus of the present disclosure includes a latent electrostatic image bearer, a charging device for charging the latent electrostatic image bearer, an irradiator for forming a latent electrostatic image on the latent electrostatic image bearer, a developing device for developing the latent electrostatic image formed on the latent electrostatic image bearer with a developing agent to form a toner image, a transfer device for transferring the toner image formed on the latent electrostatic image bearer to a printing medium, a fixing device for fixing the toner image transferred to the printing medium, and other optional devices such as a discharging device (quencher), a cleaning device, a recycling device, and a controlling device. The developing device used in this image forming is the developing agent of the present disclosure.

Toner Accommodating Unit

The toner accommodating unit in the present disclosure contains toner in a unit capable of accommodating the toner. The toner accommodating unit includes a toner accommodating container, a developing device, and a process cartridge.

The toner accommodating container is a vessel containing a toner.

The developing unit has a device for accommodating toner and developing with the toner.

The process cartridge integrally includes at least a latent electrostatic image bearer and a developing device, accommodates toner, and is detachably attachable to an image forming apparatus. The process cartridge may further include at least one member selected from the group consisting of a charger, an exposure, and a cleaning device.

Image Forming Apparatus

Next, an embodiment of image forming with the image forming apparatus of the present disclosure is described with reference to FIG. 1. One of the image forming apparatuses in the present embodiment is a printer. However, the image forming apparatus is not particularly limited to an apparatus such as a printer, a photocopier, a facsimile machine, or a multifunction peripheral as long as it can form images with toner.

An image forming apparatus 200 includes a sheet feeding unit 210, a conveyance unit 220, an image forming unit (latent electrostatic image forming device) 230, a transfer unit (transfer device) 240, and a fixing unit (fixing device) 250.

The sheet feeding unit 210 includes a sheet feeding cassette 211 on which sheets to be fed are piled and a feeding roller 212 that feeds a sheet (recording medium) P piled on the sheet feeding cassette 211 one by one.

The conveyance unit 220 includes a roller 221 for conveying the sheet P fed by the feeding roller 212 toward the transfer unit 240, a pair of timing rollers 222 for pinching the front end of the sheet P conveyed by the roller 221 on standby and sending out the sheet P to the transfer unit 240 at a particular timing, and ejection rollers 223 for ejecting the sheet P on which toner is fixed by the fixing unit 250 to an ejection tray 224.

The image forming part 230 includes an image forming unit (latent electrostatic image bearer) 234Y that forms an image using a developing agent containing yellow toner, an image forming unit 234C that forms an image using a developing agent containing cyan toner, an image forming unit 234M that forms an image using a developing agent containing magenta toner, and an image forming unit 234K that forms an image using a developing agent containing black toner, sequentially standing from left to right in the drawing with a particular interval. The image forming part 230 also includes a charger 232 (232Y, 232M. 232C. 232K) and an irradiator 233 that emits beams of light L. The irradiator 233 includes a light source 233*a* and a polygon mirror 233*b* (233*b*Y, 233*b*M, 233*b*C, 233*b*K) that redirects the beams of light L to the charger 232.

An arbitrary image forming unit of the image forming units 234Y, 234C, 234M, and 234K is referred to as an image forming unit.

In addition, the developing agent contains toner and carrier. The four image forming units have substantially the same structure except for the individual developing agents used for respective image forming units.

The transfer unit 240 includes a driving roller 241, a driven roller 242, an intermediate transfer belt 243 disposed rotatable counterclockwise in the drawing in accordance with the drive of the driving roller 241, a primary transfer roller (244Y, 244C, 244M, and 244K) disposed facing the drum photoconductor (latent electrostatic image bearer) 231 with the intermediate transfer belt 243 therebetween, and a secondary facing roller 245 and a secondary transfer roller 246 disposed facing each other at the point of the toner image transferred to the sheet P with the intermediate transfer belt 243 therebetween.

A fixing device 250 with a heater inside includes a fixing belt 251 for heating the sheet P and a pressing roller 252 for forming a nip with the fixing belt 251 by rotatably pressing it. Heat is applied with pressure to the color toner image on the sheet P at the nipping portion, thereby fixing the color toner image. The sheet P on which the color toner image is fixed is ejected to the ejection tray 224 by the ejection rollers 223, which completes a series of image forming process.

Process Cartridge

The process cartridge relating to the present disclosure is made to be detachably attachable to an image forming apparatus. It includes at least a latent electrostatic image bearer and a developing device that renders the latent electrostatic image visible with a developing agent containing the toner of the present disclosure to form a toner image. The process cartridge of the present disclosure may furthermore include other optional devices.

The developing device includes at least a developing agent container that contains a developing agent and a developing agent bearer that bears and conveys the developing agent in the developing agent container. The developing device may furthermore optionally include a regulating member for regulating the thickness of the developing agent borne on the bearer.

Figure 2:
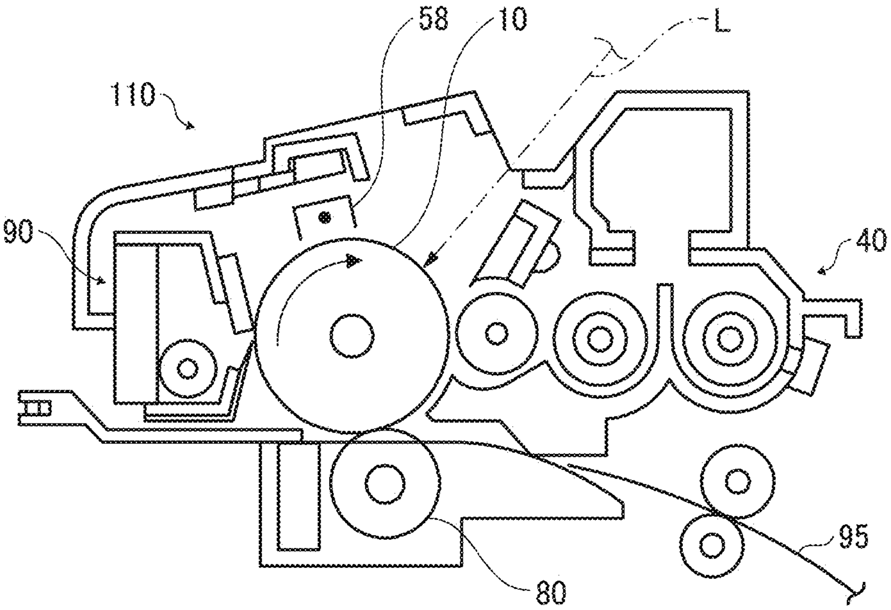
FIG. 2 is a schematic diagram illustrating an example of a process cartridge using an embodiment of the present invention.

FIG. 2 is a diagram illustrating an example of the process cartridge relating to the present disclosure. The process cartridge 110 includes a drum photoconductor (latent electrostatic image bearer) 10, a corona charger 58, a developing device 40, a transfer roller 80, and a cleaner 90. The process cartridge processes a recording medium 95—paper, for example.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Embodiments of the present disclosure is described with reference to Examples and Comparative Examples. Embodiments of the present disclosure is not limited to Examples. The terms "part(s)" and "percent" refer to part(s) by mass and percent by mass, respectively.

Manufacturing of Toner

Synthesis Example 1 of Binder Resin

The following components were placed in a reaction container equipped with a condenser, a stirrer and a nitrogen introducing tube to allow a reaction at 230 degrees C. at normal pressure for 8 hours followed by another reaction for 5 hours with a reduced pressure of to 15 mmHg. Subsequent to cooling down to 160 degrees C., 32 parts of phthalic anhydride was added to allow a 2-hour reaction.

Adduct of bisphenol A with 2 mols of ethylene oxide: 724 parts
Isophthalic acid: 276 parts
Dibutyl tin oxide: 2 parts The obtained reactant was cooled down to 80 degrees C. and allowed to react with 188 parts of isophorone diisocyanate in ethyl acetate for two hours to obtain Prepolymer P1 Containing Isocyanate.

Thereafter, 267 parts of Prepolymer P1 Containing Isocyanate and 14 parts of isophoronediamine were allowed to react at 50 degrees C. for two hours to obtain Urea-modified Polyester U1 with a weight average molecular weight of 64,000.

A total of 724 parts of an adduct of bisphenol A with 2 mols of ethylene oxide and 276 parts of terephthalic acid were polycondensed at 230 degrees C. for 8 hours at a normal pressure as described above. Subsequently, the reaction was allowed to continue for 5 hours with a reduced pressure of 10 to 15 mmHg to obtain a non-modified Polyester E1 with a peak molecular weight of 5,000.

A total of 200 parts of Urea-modified Polyester U1 and 800 parts of the non-modified polyester E1 were dissolved and mixed in 2,000 parts of a solvent mixture of ethyl acetate and methylethylketone (MEK) at a mixing ratio of 1 to 1 to obtain a solution of ethyl acetate and MEK of Binder Resin B1.

The solution obtained was partially dried with a reduced pressure to isolate Binder Resin B1.

Synthesis of Polyester Resin A

Terephthalic acid: 60 parts
Dodecenyl succinic anhydride: 25 parts
Trimellitic anhydride: 15 parts
Bisphenol A (2,2) propylene oxide: 70 parts
Bisphenol A (2,2) ethylene oxide: 50 parts The components mentioned above were charged in a 1 L four-necked flask equipped with a thermometer, a stirrer, a condenser, and a nitrogen gas introducing tube. This flask was set on a mantle heater. Nitrogen gas was introduced into the flask through the nitrogen gas introducing tube. The temperature in the flask was raised while the inert gas atmosphere was kept inside the flask. Subsequently, 0.05 g of dibutyltin oxide was added to allow reaction at 200 degrees C. Polyester Resin A was thus obtained.

Manufacturing Example 1 of Master Batch

Pigment (C.I. Pigment Blue 15:3): 40 parts
Binder resin (Polyester resin A): 60 parts
Water: 30 parts The raw materials specified above were mixed in a HENSCHEL MIXER to obtain a mixture in which water was infiltrated into the pigment agglomerating body. The mixture was mixed and kneaded for 45 minutes with two rolls where the temperature of the surface was set at 130 degrees C. and thereafter pulverized by a pulverizer to the size of a diameter of 1 mm to obtain Master Batch M1.

Manufacturing Example A of Toner

A total of 240 parts of the solution of ethylacetate and MEK of Binder Resin B1, 20 parts of pentaerythritol tetrabehenate (melting point: 81 degrees C., melt viscosity: 25 cps), and 8 parts of Master Batch M1 were placed in a beaker and stirred at 60 degrees C. with a TK type HOMOMIXER at 12,000 rotations per minute (rpm) for uniform dissolution and dispersion to prepare a toner liquid material.

The following was placed and uniformly dissolved in a beaker.

Deionized water: 706 parts
10 percent liquid suspension of hydroxyapatite: 294 parts (SUPER TIGHT 10, available from Nippon Chemical Industrial CO., LTD.)
Dodecylbenzene sodium sulfate: 0.2 parts Subsequently, the solution was heated to 60 degrees C. and the toner liquid material was charged in the beaker under stirring at 12,000 rpm for 10 minutes with a TK type HOMOMIXER.

Thereafter, the liquid mixture was placed in a Kolben equipped with a stirring bar and a thermometer and heated to 98 degrees C. to remove the solvent. Subsequent to filtering, rinsing, and drying, the resulting dried matter was air-classified to obtain Mother Toner Particle A.

A total of 100 parts of Mother Toner Particle A was mixed with 1.0 part of hydrophobized silica and 1.0 part of hydrophobized titanium oxide with a HENSCHEL MIXER to obtain Toner A.

The diameter of Toner A was measured with a particle size measuring instrument (Coulter Counter TA2, available from Beckman Coulter, Inc.) with an aperture diameter of 100 μm to obtain Toner A with a volume average particle diameter Dv of 6.2 μm and a number average particle diameter Dn of 5.1 μm.

Manufacturing of Carrier

Manufacturing Example 1 of Carrier

Core Material 1

Mn—Mg—Sr ferrite: Average particle diameter: 36 μm, Rz: 2.1 μm, apparent density of core material: 2.5 g/cm$^3$ Coating Liquid 1

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (antimony): 50 parts Toluene: 6,000 parts The materials specified above for Coating Liquid 1 were dispersed with a Homomixer for 10 minutes to prepare a liquid for forming a coating layer.

The liquid for forming a coating layer of Coating Liquid 1 was applied to the surface of Core Material 1 with SPIRA COTA® (available from OKADA SEIKO CO., LTD.) in a 60 degrees C. atmosphere at a ratio of 30 g/min to achieve a surface's thickness of 0.4 μm. The thickness was adjusted by the amount of liquid. The thus-obtained carrier was left to rest for baking in an electric furnace at 160 degrees C. for one hour. Subsequent to cooling down, the resulting cooled substance was cracked with a sieve with an opening of 100 μm to obtain Carrier 1.

Manufacturing Example 2 of Carrier

Core Material 2

Mn—Mg—Sr ferrite: Average particle diameter: 36 μm, Rz: 2.9 μm, apparent density of core material: 2.2 g/cm$^3$ Carrier 2 was obtained in the same manner as in Manufacturing Example 1 of Carrier except that the core material was changed to Core Material 2.

The electrical resistance value of Carrier 2 was the same as that of Carrier 1.

Manufacturing Example 3 of Carrier

Core Material 3

Mn—Mg—Sr ferrite: Average particle diameter: 36 μm, Rz: 1.9 μm, apparent density of core material: 2.5 g/cm$^3$ Carrier 3 was obtained in the same manner as in Manufacturing Example 1 of Carrier except that the core material was changed to Core Material 3.

The electrical resistance value of Carrier 3 was the same as that of Carrier 1.

Manufacturing Example 4 of Carrier

Core Material 4

Mn—Mg—Sr ferrite: Average particle diameter: 36 μm, Rz: 3.1 μm, apparent density of core material: 2.2 g/cm$^3$.

Carrier 4 was obtained in the same manner as in Manufacturing Example 1 of Carrier except that the core material was changed to Core Material 4. The electrical resistance value of Carrier 4 was the same as that of Carrier 1.

Manufacturing Example 5 of Carrier

Core Material 5

Mn—Mg—Sr ferrite: Average particle diameter: 36 μm, Rz: 2.3 μm, apparent density of core material: 2.3 g/cm$^3$ Coating Liquid 2

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (phosphorine-doped tin oxide): 1,300 parts Toluene: 6,000 parts Carrier 5 was obtained in the same manner as in Manufacturing Example 1 of Carrier except that Coating Liquid 2 was used as the liquid for forming a coating layer. The amount of the conductive particles was adjusted to match the electrical resistance of the carrier immediately after manufacturing with that of Carrier 1.

Manufacturing Example 6 of Carrier

Coating Liquid 3

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (antimony-doped tin oxide): 1,100 parts Toluene: 6,000 parts Carrier 6 was obtained in the same manner as in Manufacturing Example 5 of Carrier except that Coating Liquid 3 was used as the liquid for forming a coating layer. The amount of the conductive particles was adjusted to match the electrical resistance of the carrier immediately after manufacturing with that of Carrier 1.

Manufacturing Example 7 of Carrier

Coating Liquid 4

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (diantimony pentoxide-doped tin oxide): 1,100 parts Toluene: 6,000 parts Carrier 7 was obtained in the same manner as in Manufacturing Example 5 of Carrier except that Coating Liquid 4 was used as the liquid for forming a coating layer. The amount of the conductive particles was adjusted to match the electrical resistance of the carrier immediately after manufacturing with that of Carrier 1.

Example 8 of Carrier Manufacturing

Coating Liquid 5

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (diantimony pentoxide-doped tin oxide-covered titanium oxide): 1,200 parts Toluene: 6,000 parts Carrier 7 was obtained in the same manner as in Manufacturing Example 5 of Carrier except that Coating Liquid 5 was used as the liquid for forming a coating layer. The amount of the conductive particles was adjusted to match the electrical resistance of the carrier immediately after manufacturing with that of Carrier 1.

Example 9 of Carrier Manufacturing

Coating Liquid 6

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (diantimony pentoxide-doped tin oxide-covered aluminum oxide): 1,200 parts Toluene: 6,000 parts Carrier 7 was obtained in the same manner as in Manufacturing Example 5 of Carrier except that Coating Liquid 6 was used as the liquid for forming a coating layer. The amount of the conductive particles was adjusted to match the electrical resistance of the carrier immediately after manufacturing with that of Carrier 1.

Example 10 of Carrier Manufacturing

Core Material 6

Mn—Mg—Sr ferrite: Average particle diameter: 36 μm, Rz: 2.1 μm, apparent density of core material: 2.6 g/cm$^3$ Carrier 10 was obtained in the same manner as in Manufacturing Example 9 of Carrier except that the core material was changed to Core Material 6. The electric resistance value of Carrier 10 was the same as that of Carrier 1.

Example 11 of Carrier Manufacturing

Core Material 7

Mn—Mg—Sr ferrite: Average particle diameter: 36 μm, Rz: 2.9 μm, apparent density of core material: 1.9 g/cm$^3$ Carrier 11 was obtained in the same manner as in Manufacturing Example 9 of Carrier except that the core material was changed to Core Material 7. The electric resistance value of Carrier 11 was the same as that of Carrier 1.

Example 12 of Carrier Manufacturing

Coating Liquid 7

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (diantimony pentoxide-doped tin oxide-covered aluminum oxide): 1,250 parts Chargeable particle (hydrotalcite): 400 parts Toluene: 6,000 parts Carrier 12 was obtained in the same manner as in Manufacturing Example 5 of Carrier except that Coating Liquid 7 was used for the liquid for forming a coating layer. The amount of the conductive particles was adjusted to match the electrical resistance of the carrier immediately after manufacturing with that of Carrier 1.

Example 13 of Carrier Manufacturing

Coating Liquid 8

Acrylic resin solution with a concentration of solid portion of 20 percent by mass: 200 parts Silicone resin solution with a concentration of solid portion of 40 percent: 2,000 parts Amino silane with a concentration of solid portion of 100 percent: 30 parts Conductive particle (diantimony pentoxide-doped tin oxide-covered aluminum oxide): 1,250 parts Chargeable particle (barium sulfate): 400 parts Toluene: 6,000 parts Carrier 13 was obtained in the same manner as in Manufacturing Example 5 of Carrier except that Coating Liquid 8 was used as the liquid for forming a coating layer. The amount of the conductive particles was adjusted to match the electrical resistance of the carrier immediately after manufacturing with that of Carrier 1.

The carriers of Manufacturing Examples 1 to 13 of Carrier are shown in Table 1.

TABLE 1

| | | Core material | | Particle in coating layer | | | |
|---|---|---|---|---|---|---|---|
| | | | | Conductive particle | | Chargeable | |
| | Carrier | Core material No. | Rz (μm) | Composition | Substrate particle | particle Composition | Apparent density (g/cm$^3$) |
| Manufacturing Example 1 | Carrier 1 | Core Material 1 | 2.1 | Antimony | None | — | 2.4 |
| Manufacturing Example 2 | Carrier 2 | Core Material 2 | 2.9 | Antimony | None | — | 2.1 |
| Manufacturing Example 3 | Carrier 3 | Core Material 3 | 1.9 | Antimony | None | — | 2.4 |
| Manufacturing Example 4 | Carrier 4 | Core Material 4 | 3.1 | Antimony | None | — | 2.1 |
| Manufacturing Example 5 | Carrier 5 | Core Material 5 | 2.3 | Phosphorine-doped tin oxide | None | — | 2.3 |
| Manufacturing Example 6 | Carrier 6 | Core Material 5 | 2.3 | Antimony-doped tin oxide | None | — | 2.3 |

TABLE 1-continued

| | | Core material | | Particle in coating layer | | | |
|---|---|---|---|---|---|---|---|
| | | | | Conductive particle | | Chargeable | Apparent |
| | Carrier | Core material No. | Rz (μm) | Composition | Substrate particle | particle Composition | density ($g/cm^3$) |
| Manufacturing Example 7 | Carrier 7 | Core Material 5 | 2.3 | Diantimony pentoxide-doped tin oxide | None | — | 2.3 |
| Manufacturing Example 8 | Carrier 8 | Core Material 5 | 2.3 | Diantimony pentoxide-doped tin oxide | Titanium Oxide | — | 2.3 |
| Manufacturing Example 9 | Carrier 9 | Core Material 5 | 2.3 | Diantimony pentoxide-doped tin oxide | Aluminum oxide | — | 2.3 |
| Manufacturing Example 10 | Carrier 10 | Core Material 6 | 2.1 | Diantimony pentoxide-doped tin oxide | Aluminum oxide | — | 2.6 |
| Manufacturing Example 11 | Carrier 11 | Core Material 7 | 2.9 | Diantimony pentoxide-doped tin oxide | Aluminum oxide | — | 1.9 |
| Manufacturing Example 12 | Carrier 12 | Core Material 5 | 2.3 | Diantimony pentoxide-doped tin oxide | Aluminum oxide | Hydrotalcite | 2.3 |
| Manufacturing Example 13 | Carrier 13 | Core Material 5 | 2.3 | Diantimony pentoxide-doped tin oxide | Aluminum oxide | Barium sulfate | 2.3 |

EXAMPLES

Example 1

Seven parts of Toner A obtained in Manufacturing Example of Toner and 93 parts of Carrier 1 obtained in Manufacturing Example 1 of Carrier were stirred in a mixer for 10 minutes to prepare Developing Agent 1.

The developing agent was placed in a machine remodeled based on a marketed product of a digital full color printer (imagio JIM C6000, available from Ricoh Co., Ltd.) and evaluated at the initial stage. Additionally, a total of 200,000 images including 100,000 images of text charts with a 5 percent image area ratio and 100,000 images of picture charts with a 20 percent image area ratio, were output for the evaluation of the developing agent in terms of long-term use.

Stability of Image Density Over Long-Term Use

For both printing at initial stage and printing over time, solid images were printed and their image density was measured using X-Rite (X-Rite 938 D50, available from Amtech Corporation).

Specifically, ΔID was calculated from the following relationship, where ID refers to the image density value of the first image measured by X-Rite and ID' represents the image density value of the image printed after outputting 200,000 images and ΔID was evaluated according to the evaluation criteria below. The grade E denotes a level that is unacceptable for practical purpose.

$$\Delta ID = ID - ID'$$

E=initial value

E'=value after outputting 200,000 images

Evaluation Criteria $$A\colon \Delta ID \leqq 0.10$$

$$B\colon 0.10 < \Delta ID \leqq 0.15$$

$$C\colon 0.15 < \Delta ID \leqq 0.22$$

$$D\colon 0.22 < \Delta ID \leqq 0.30$$

$$E\colon 0.30 < \Delta ID$$

Carrier Adherence

In each of the initial and long-term printing with the developing agent, solid images and image patterns consisting of two-dot lines (100 lpi/inch) in the sub-scan direction were printed on A3 paper. The white voids caused by the carrier adhering to the solid image and the spaces between the two-dot lines were visually observed and the number of voids were counted to evaluate according to the following evaluation criteria. The grade E denotes a level that is unacceptable for practical purpose.

Evaluation Criteria

A: 0 voids

B: 1 to 2 voids

C: 3 to 6 voids

D: 7 to 10 voids

E: 11 or more voids

Ghost Image

A solid image was output with the developing agent at initial stage and the difference between the image density at the leading edge of the image and the image density thereof after one round of the developing roller was visually observed to evaluate ghost, Evaluation Criteria A: Excellent B: Good C: Fair D: Intolerable for practical purpose Examples 2 to 9 and Comparative Examples 1 to 3

Carrier 2 to Carrier 13 were evaluated in the same manner as in Example 1 except that Developing Agent 2 to Developing Agent 13 were used instead.

The carriers of the developing agents for use in Examples and Comparative Examples and the evaluation results are shown in Table 2.

TABLE 2

| | Developing agent No. | Carrier No. | Stability of image density over long-term use | Carrier adherence: Developing agent at initial stage | Carrier adherence: Developing agent after long-term use | Ghost image |
|---|---|---|---|---|---|---|
| Example 1 | Developing agent 1 | Carrier 1 | D | C | D | B |
| Example 2 | Developing agent 2 | Carrier 2 | C | D | D | A |
| Comparative Example 1 | Developing agent 3 | Carrier 3 | E | C | E | B |
| Comparative Example 2 | Developing agent 4 | Carrier 4 | C | E | E | A |
| Comparative Example 3 | Developing agent 5 | Carrier 5 | D | D | E | B |
| Example 4 | Developing agent 6 | Carrier 6 | C | C | D | B |
| Example 3 | Developing agent 7 | Carrier 7 | C | C | D | B |
| Example 4 | Developing agent 8 | Carrier 8 | C | C | C | B |
| Example 5 | Developing agent 9 | Carrier 9 | C | B | C | B |
| Example 6 | Developing agent 10 | Carrier 10 | C | A | B | C |
| Example 7 | Developing agent 11 | Carrier 11 | C | C | D | A |
| Example 8 | Developing agent 12 | Carrier 12 | B | B | C | B |
| Example 9 | Developing agent 13 | Carrier 13 | A | B | C | B |

The aspects of the present disclosure are, for example, as follows:

Aspect 1; A carrier that contains a core material with a surface roughness Rz of from 2.0 to 3.0 μm and a coating layer that covers the core material, the coating layer containing an antimony-containing particle.

Aspect 2: The carrier according to Aspect 1 mentioned above, wherein the antimony-containing particle contains an antimony particle.

Aspect 3: The carrier according to Aspect 1 or 2 mentioned above, wherein the antimony-containing particle contains an antimony-doped tin oxide particle.

Aspect 4: The carrier according to any one of Aspects 1 to 3 mentioned above, wherein the antimony-containing particle contains a substrate of an inorganic particle with the antimony-doped tin oxide particle thereon.

Aspect 5: The carrier according to Aspect 4 mentioned above, wherein the inorganic particle contains aluminum oxide.

Aspect 6: The carrier according to any one of Aspects 1 to 3 mentioned above, wherein antimony in the antimony-containing particle comprises diantimony pentoxide.

Aspect 7: The carrier according to any one of Aspects 1 to 3 mentioned above, wherein the carrier has an apparent density of from 2.0 to 2.5 g/cm$^3$.

Aspect 8: The carrier according to any one of Aspects 1 to 3 mentioned above, wherein the coating layer contains a chargeable particle.

Aspect 9: The carrier according to Aspect 8 mentioned above, wherein the chargeable particle contains barium sulfate.

Aspect 10: A developing agent contains the carrier of any one of Aspects 1 to 9 mentioned above.

Aspect 11: An image forming method includes forming a latent electrostatic image on a latent electrostatic image bearer, developing the latent electrostatic image formed on the latent electrostatic image bearer with the developing agent of Aspect 10 mentioned above to form a toner image, transferring the toner image formed on the latent electrostatic image bearer to a recording medium, and fixing the toner image transferred to the recording medium.

Aspect 12: An image forming apparatus contains a latent electrostatic image bearer, a charger for charging the latent electrostatic image bearer, an irradiator for irradiating the latent electrostatic image bearer with light to form a latent electrostatic image, a developing device for developing the latent electrostatic image formed on the latent electrostatic image bearer with the developing agent of Aspect 10 mentioned above to form a toner image, a transfer device for transferring the toner image formed on the latent electrostatic image bearer onto a recording medium, and a fixing device for fixing the toner image transferred to the recording medium.

Aspect 13: A process cartridge contains a latent electrostatic image bearer, a charger for charging the latent electrostatic image bearer, a developing device for developing a latent electrostatic image formed on the latent electrostatic image bearer with the developing agent of Aspect 10 mentioned above, and a cleaning device for cleaning the latent electrostatic image bearer.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A carrier comprising:

a core material with a surface roughness Rz of from 2.0 to 3.0 μm; and a coating layer to cover the core material, the coating layer comprising an antimony-containing particle, wherein antimony in the antimony-containing particle comprises diantimony pentoxide.

2. The carrier according to claim 1, wherein the antimony-containing particle comprises an antimony particle.

3. The carrier according to claim 1, wherein the antimony-containing particle comprises an antimony-doped tin oxide particle.

4. The carrier according to claim 3, wherein the antimony-containing particle comprises a substrate of an inorganic particle with the antimony-doped tin oxide particle thereon.

5. The carrier according to claim 4, wherein the inorganic particle comprises aluminum oxide.

6. The carrier according to claim 1, wherein the carrier has an apparent density of from 2.0 to 2.5 $g/cm^3$.

7. The carrier according to claim 1, wherein the coating layer comprises a chargeable particle.

8. The carrier according to claim 7, wherein the chargeable particle comprises barium sulfate.

9. A developing agent comprising:

a carrier comprising:

a core material with a surface roughness Rz of from 2.0 to 3.0 μm; and a coating layer to cover the core material, the coating layer comprising an antimony-containing particle, wherein antimony in the antimony-containing particle comprises diantimony pentoxide.

10. An image forming method comprising:

forming a latent electrostatic image on a latent electrostatic image bearer;

developing the latent electrostatic image formed on the latent electrostatic image bearer with the developing agent of claim 9 to form a toner image;

transferring the toner image formed on the latent electrostatic image bearer to a recording medium; and fixing the toner image transferred to the recording medium.

11. An image forming apparatus comprising:

a latent electrostatic image bearer;

a charger to charge the latent electrostatic image bearer;

an irradiator to irradiate the latent electrostatic image bearer with light to form a latent electrostatic image;

a developer to develop the latent electrostatic image formed on the latent electrostatic image bearer with the developing agent of claim 10 to form a toner image;

a transferer to transfer the toner image formed on the latent electrostatic image bearer onto a recording medium; and a fixer to fix the toner image transferred to the recording medium.

12. A process cartridge comprising:

a latent electrostatic image bearer;

a charger to charge the latent electrostatic image bearer;

a developer to develop a latent electrostatic image formed on the latent electrostatic image bearer with the developing agent of claim 10; and a cleaner to clean the latent electrostatic image bearer.

13. The image forming apparatus according to claim 11, further comprising:

a sheet feeder that includes a sheet feeding cassette on which sheets of the recording medium to be fed are piled and a feeding roller that feeds a sheet one by one.

14. The image forming apparatus according to claim 11, further comprising:

a conveyance unit that includes a roller for conveying the recording medium toward the transferer;

a pair of timing rollers for pinching a front end of the recording medium on standby and sending out the recording medium to the transferer at a particular timing; and ejection rollers for ejecting the recording medium to an ejection tray.

15. The image forming apparatus according to claim 11, wherein:

the irradiator includes a light source and a polygon mirror that redirects beams of light to the charger.

16. The image forming apparatus according to claim 11, wherein the transferer includes:

a driving roller;

a driven roller;

an intermediate transfer belt disposed rotatable in accordance with the drive of the driving roller;

a primary transfer roller disposed facing the latent electrostatic image bearer with the intermediate transfer belt therebetween;

a secondary facing roller; and a secondary transfer roller disposed facing the secondary facing roller.

17. The image forming apparatus according to claim 11, wherein the fixer includes:

a heater;

a fixing belt for heating the recording medium; and a pressing roller for forming a nip with the fixing belt by rotatably pressing the fixing belt.

18. The process cartridge according to claim 12, wherein:

the charger is a corona charger.

19. The process cartridge according to claim 12, further comprising:

a transfer roller.

* * * * *